United States Patent [19]

Furucz

[11] 4,018,199
[45] Apr. 19, 1977

[54] CARBURATION SYSTEM FOR AN INTERNAL COMBUSTION

[76] Inventor: Istvan Furucz, 3964 rue St-Denis, apt 12, Montreal, Quebec, Canada

[22] Filed: Feb. 5, 1976

[21] Appl. No.: 655,632

[30] Foreign Application Priority Data

Feb. 7, 1975 Canada .............................. 219576

[52] U.S. Cl. ..................... 123/127; 123/139 BG; 123/121; 123/59 PC; 261/23 A; 261/39 D
[51] Int. Cl.² ......................................... F02M 13/06
[58] Field of Search ............. 123/121, 59 PC, 127, 123/122 AB, 122 A, 139 BG, 52 MV, 179 L, 179 G, 106, 187.5 R, 139 AW, 119 R; 261/23 A, 39 D

[56] References Cited

UNITED STATES PATENTS

| | | | |
|---|---|---|---|
| 2,145,863 | 2/1939 | Curioni | 261/23 A |
| 2,597,780 | 5/1952 | Engnath | 261/23 A |
| 3,826,234 | 7/1974 | Cinquegrani | 123/139 |

*Primary Examiner*—Ronald H. Lazarus
*Attorney, Agent, or Firm*—Alan Swabey & Co.

[57] ABSTRACT

The disclosure describes the improvement to a carburation system for an internal combustion motor which operates with a mixture of motor fuel vapor and air. The system comprises a carburetor, a heat exchanger and an admission block. The main object of the present invention is to decrease in a positive manner the losses of power of the explosion in the motor-cylinder, which are caused by a premature expansion of the air during its passage in the heat exchange compartments. The invention is characterized by the fact that a portion only of the air which is required for the explosion will pass in the heat exchange compartment with the motor fuel which will be transformed into vapor under the effect of heat. The other part of the air will go through the heat exchanger (by an independent air duct) will arrive directly in the system of admission of the motor cylinder. In this location, a mixture of motor fuel vapor and air will be formed which has an ideal volume ratio and which is at a moderate temperature while entering into the combustion chambers.

32 Claims, 18 Drawing Figures

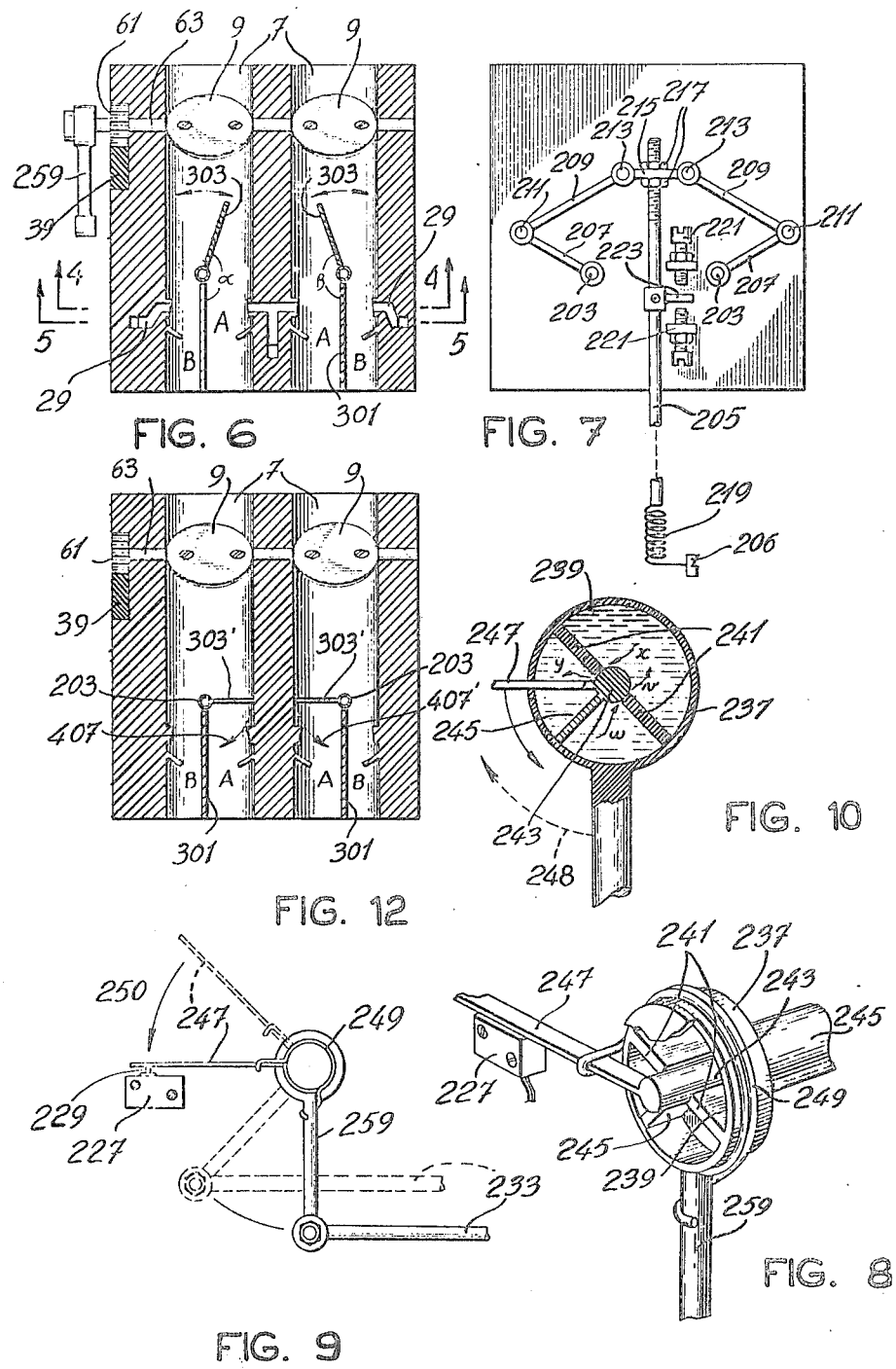

CARBURATION SYSTEM FOR AN INTERNAL COMBUSTION

The present description concerns an improvement to my invention entitled: "Carburation System for Internal Combustion Motor," described in Canadian Pat. No. 951,200. It can be adapted for use with any motor of this kind, whenever the number and size of the cylinders.

In general, the principle upon which the system according to my invention is based, consists in utilizing the energy of the heat which is released by the motor itself, more specifically by the exhaust gases, in order to convert the hydrocarbon into vapour between the carburetor and the admission to the motor cylinders. In this manner, the mixture of motor fuel vapour which penetrates into the cylinders where the explosion takes place, is very efficient.

According to the above principle, an object of my invention is therefore to provide a device enabling to improve the carburation of the internal combustion engines in order to obtain a substantial reduction of the consumption of the motor fuel while preserving the original performances of the motor.

Another object of the invention consists in decreasing in a substantial manner the pollution caused by carbon monoxide and other toxic debris while obtaining an improved combustion of the motor fuel.

An additional object resides in the fact that the system of carburation according to my invention allows a reduction of the wear of the mechanical pieces of the motor which for a good part is caused by particles of debris which are formed by incompletely burnt or unburnt motor fuel and are carried by the lubricating oil of the motor.

In order to achieve the above objects, the carburation system which is proposed by the present invention comprises a carburator which is characterized by operating as a system of injection, and which enables each motor cylinder to have its own carburation, which carburation is moreover distinct and independent from that of the other motor cylinders. Moreover, the system is provided with a mechanism enabling to realize a proportioning of motor fuel and air in constant volume ratio for any conditions under which the motor operates.

The carburetor enables to send directly to the motor-cylinders an excess of motor fuel thus allowing for an easy start under cold weather conditions, for as long as the heat exchanger used with this carburetor does not become sufficiently hot to be functional.

Finally, this carburation system is provided with an automatic device enabling to obtain a regularization of the temperature of the mixture of motor fuel vapour and air which is received by the motor cylinders, thus eliminating the power losses of the explosion in the motor-cylinder, which are caused by a premature dilatation of the air during its passage in the heat exchange compartments.

Fundamentally, the carburation device, according to my invention, comprises a heat exchanger which is heated at high temperature by the exhaust gases, such as mentioned previously, and which converts the mixture of motor fuel and air which is fed by the carburetor into a mixture of motor fuel vapour and air. In order to decrease in a positive manner the losses of power of the explosion in the cylinder-motor, which are caused by the premature dilitation of the air during its passage through the heat-exchange compartments, the invention is characterized by the fact that only a portion of the air which is required to produce the explosion will pass through the heat exchange compartment with the motor fuel which will be converted into vapour under the effect of the heat. The other portion of the air will pass through the heat exchanger via an independent air duct in order to arrive directly into the system of admission into the motor cylinder. In this location, a mixture of motor fuel vapour and air will be formed which has an ideal volume ratio and which is at a moderate temperature when it penetrates into the combustion chamber.

The new type of carburetor according to my invention comprises a body provided with a number of carburation chambers which is equal to the number of motor-cylinders of the motor to which this carburetor is intended. Each carburation chamber is provided with means for controlling the admission of air, such as conventional butterfly valves. The body also defines a motor fuel reservoir. The carburation chambers of the carburetor, below the butterfly valve for controlling the admission of air and in the direction of introduction of air, will be divided into two parts by means of a partition, according to a predetermined dimension ratio to form inside each carburation chamber two compartments which are independent of one another.

In each carburation chamber there is a half-circular flak which is pivotally mounted on said partition and an automatic control mechanism which will synchronize the position of each half-circular flak in order to enable at the same time and with the same precision the quantity of air which will pass into both compartments of each carburation chamber.

In connection with the heat exchanger which is connected to this carburetor, it comprises a body which is provided with the same number of independent heat exchange compartments and air ducts as the number of carburation chambers, so that when the carburetor is fixedly mounted on the heat exchanger, the two compartments of each carburation chamber will respectively be contiguous with an air duct which extends through the exchanger and with a heat exchanger compartment to which it is intended.

Means are provided for carrying the combustion gases of the motor around the heat exchange compartments.

Finally, the carburation system according to my invention comprises a block for the admission to the cylinder-motors, which is connected to the body of the exchanger and which comprises the same number of independent admission chambers as the cylinder-motors, each chamber receiving the product of a carburation chamber, which passes through a heat exchange compartment and an air exchange duct, to supply a motor cylinder to which the product is intended.

The carburation system operates in the following manner. As mentioned above, the body of the carburetor defines a motor fuel reservoir. This reservoir is fed and is being maintained under constant pressure by means of a fuel pump which feeds the fuel through an adjustable pressure regulator.

A primary circuit for feeding fuel to the motor cylinders, comprising an accelerator valve, (since in fact its function is related to the acceleration pedal) is mounted in the reservoir of the carburetor and is provided with the same number of orifices in the shape of longitudinal slots as the carburation chambers; each longitudinal slot is individually and separately connected to a carburation chamber, in order that the operation of the acceleration valve instaneously discharges the motor fuel always in the same quantity in the first compartment of each carburation chamber, said carburation chambers being continuous with the heat exchange compartments of the exchanger.

During the acceleration, the orifices in the form of slots are more or less obstructed in order to regularize the flow of motor fuel towards the carburation chambers.

A mechanism wherein the operation is dependent on the acceleration valve, simultaneously connects all the air admission flaps in order to allow them to have a synchronized action, thus enabling each carburation chamber to produce a mixture of air and motor fuel in which the volume ratio is constant under any conditions under which the motor operates.

As pointed out above, for each carburation chamber the acceleration valve discharges the motor fuel in the compartment which corresponds to the heat exchange compartment, while the air which is allowed to pass by the air admission flap will be introduced through the two compartments of the carburation chamber.

A mechanism which is controlled by a thermostat which depends on the temperature of the mixture of motor fuel vapour and air which is formed in the system of admission to the motor cylinder adjusts the position of the half-circular flap which is mounted on the partition which separates the two compartments in each carburation chambers to reqularize the proportion of the quantity of air which penetrates into the heat exchange compartments with the motor fuel which will be converted into vapour.

Thus, under the same operating conditions each cylinder of the motor will receive an ideal volume amount of a mixture of motor fuel vapour and air, at moderate temperature.

The present invention also proposes two ways to prevent that the equilibrium of the mixture of motor fuel vapour and air be broken in favor of the air, when the motor suddenly undergoes a rapid or sudden change.

Finally, in order to complete this carburation system, the carburetor is provided with a secondary circuit for feeding the motor-cylinders, which secondary circuit is independent from the primary circuit. This secondary circuit comprises an automatically controlled valve which is mounted in the reservoir of the carburetor and channels which lead from said valve in order to individually and separately connect it to the second compartment of each carburation chamber. These compartments form a continuity with the air ducts of the exchanger. This valve will contribute to the supply of a surplus of motor fuel directly to the motor-cylinders in order to produce a rapid start when the motor is cold so long as the heat exchanger does not become sufficiently hot to be functional.

It should be mentioned here that it will be possible to obtain a better operation of this carburation system during winter or under cold weather conditions, by reducing by any known means the minimum temperature of the air which enters the carburation chambers.

Other characteristics of the invention will appear from the description which follows of a practical embodiment, giving only by way of an example and without limitation, this description referring to the drawings which are illustrated in terms of a V8 motor and in which:

FIG. 6 is a cross-section view of a carburetor according to my invention;

FIG. 7 is a view of a system of thermostatic control intended to operate the half-circular flaps of the carburation chambers;

FIG. 8 is a perspective view of a hydraulic choke system operating at an adjustable speed of expansion which is used to control the opening of one of the valves of the secondary circuit;

FIG. 9 is a view illustrating the extreme positions of the choke system;

FIG. 10 is a view partially in section of the same choke system;

FIG. 12 is a cross-section view of a carburetor according to my invention, provided with flaps in a different position than those illustrated of FIG. 6;

Figure 2:
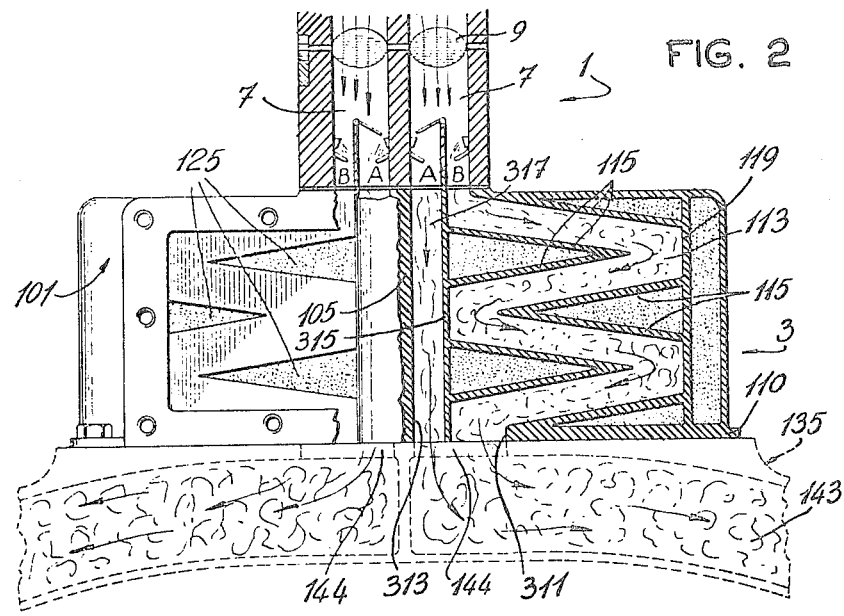
FIG. 2 is a view in elevation of the admission block and partially in section of the exchanger, the admission block being illustrated in dotted lines.
Figure 1:
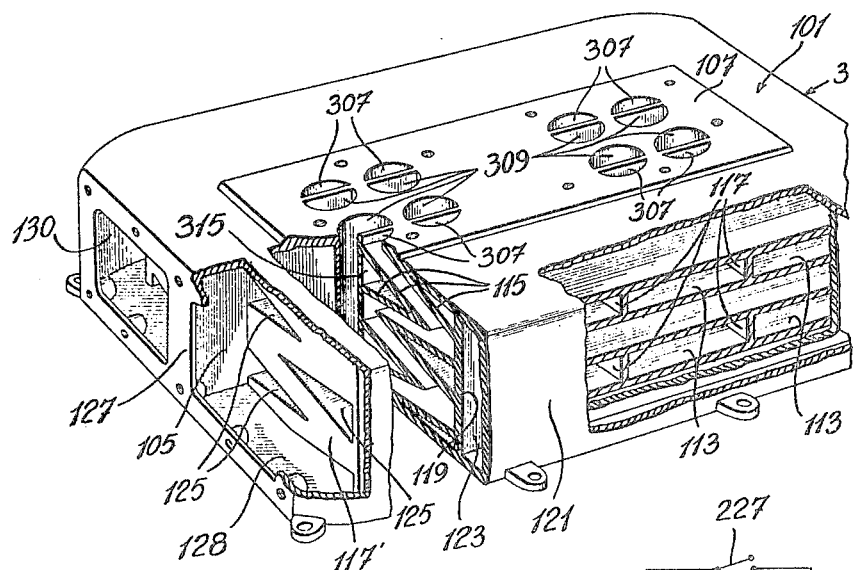
FIG. 1 is a view in perspective, and partially in cross section of the improved exchanger.
Figure 11:
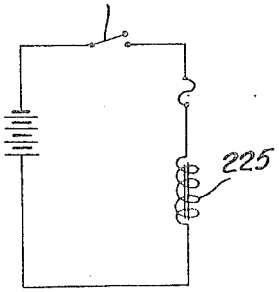
FIG. 11 is a view of the electrical circuit which is used in connection with the choke system.
Figure 3:
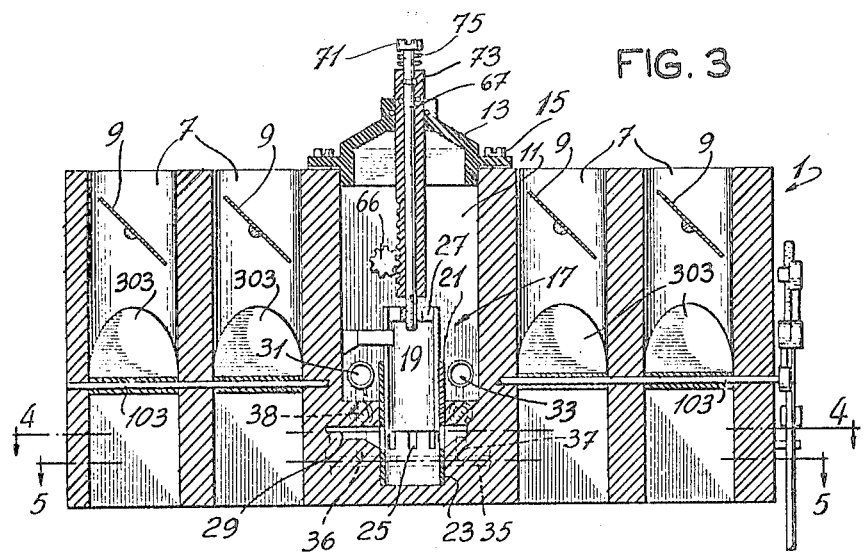
FIG. 3 is a vertical cross section along the plane of line 3—3 of FIG. 4 of an improved carburetor according to my invention.
Figure 4:
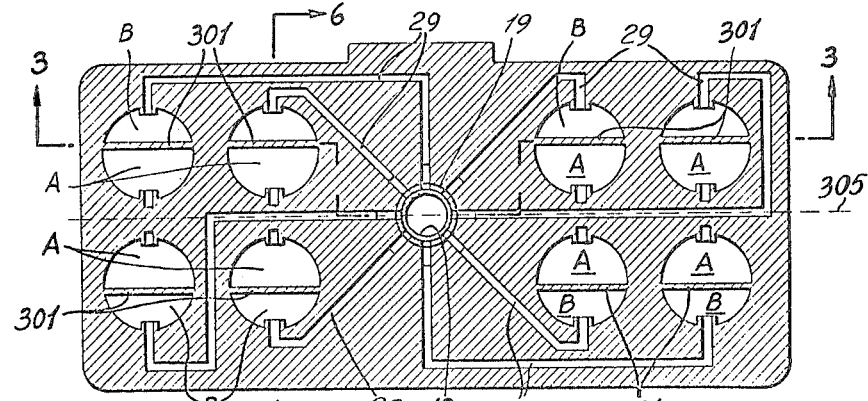
FIG. 4 is a horizontal plan view along a plane passing by line 4—4 of FIG. 6.
Figure 5:
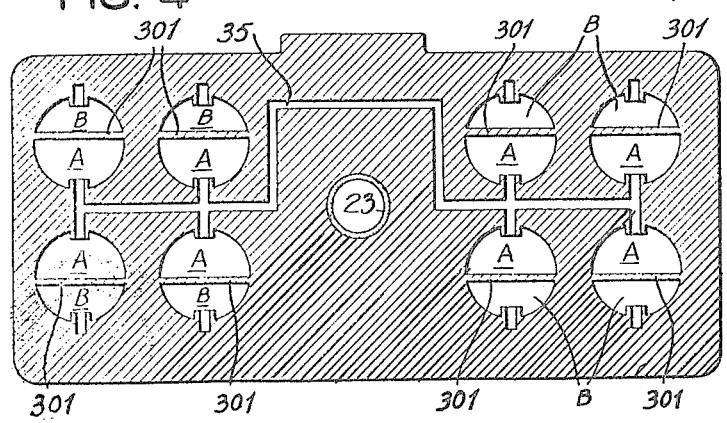
FIG. 5 is a horizontal plan view along a plane passing by line 5—5 of FIG. 6 at a level which is somewhat lower than the one illustrated in FIG. 4.
Figure 13:
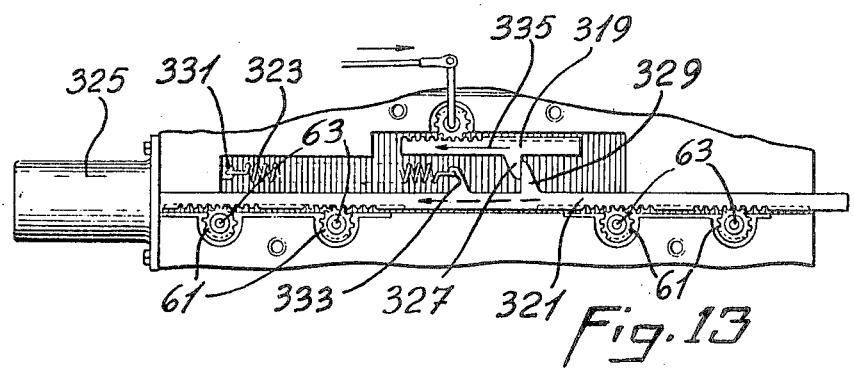
FIG. 13 is a view in elevation of the improved carburetor, the cover being removed to show the control mechanism of the primary circuit.
Figure 14:
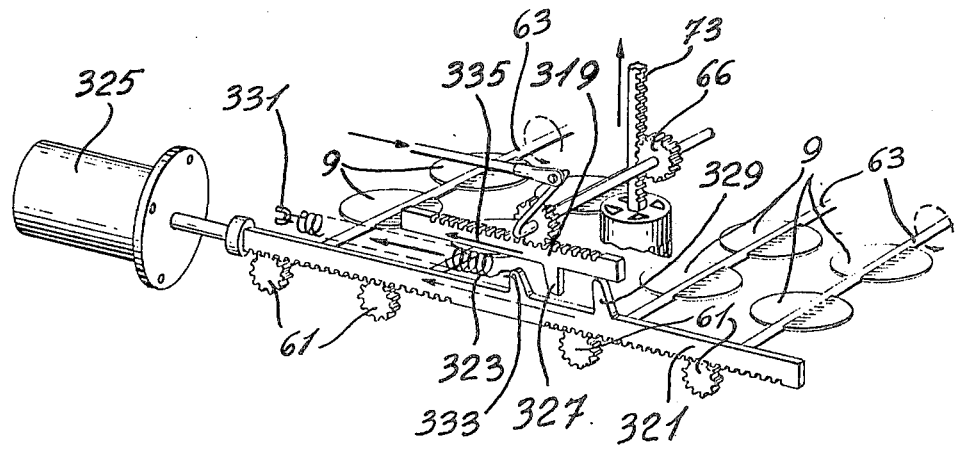
FIG. 14 is a perspective of the control mechanism of a system of acceleration.
Figure 15:
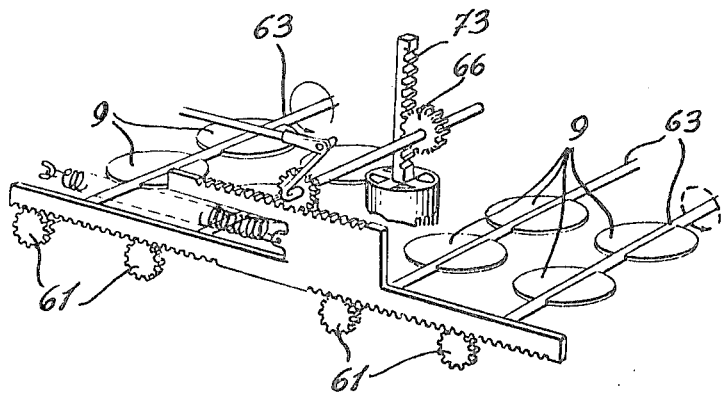
FIG. 15 is a perspective view of a different mechanism of the system of acceleration.
Figure 16:
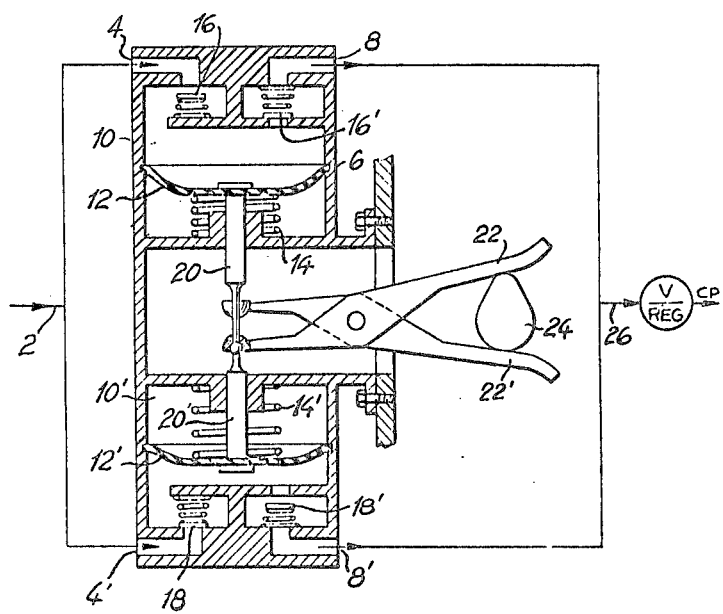
FIG. 16 is a schematical view of a means of feeding the carburetor.
Figure 17:
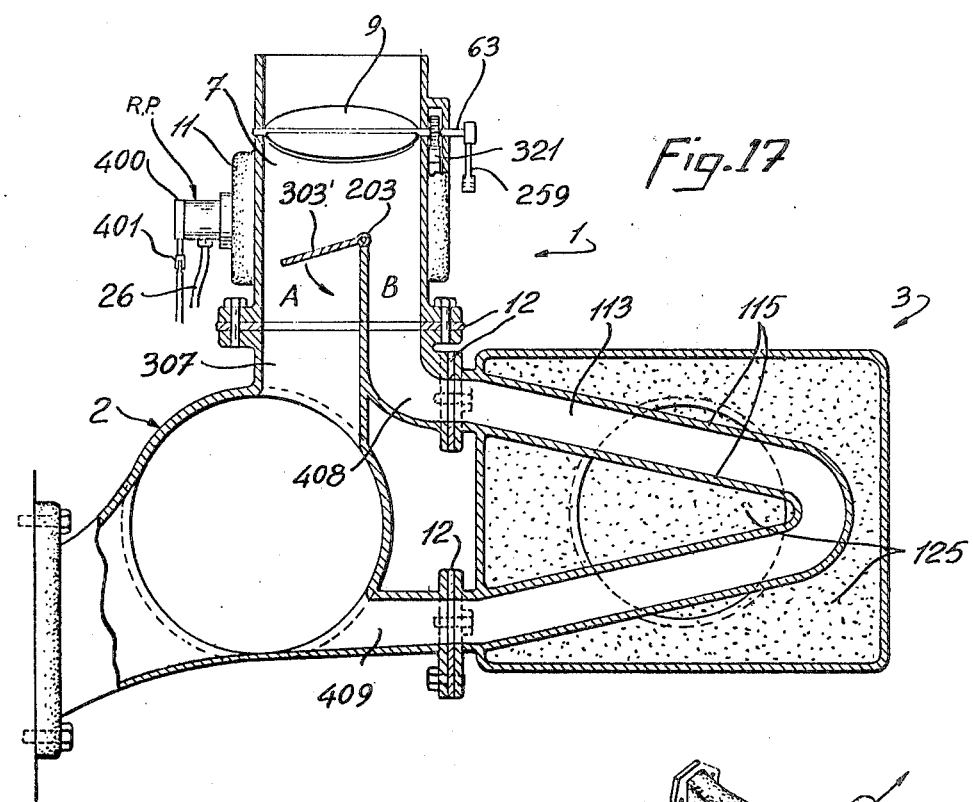
FIG. 17 is a cross-section view of the carburation system in its most simple aspect.
Figure 18:
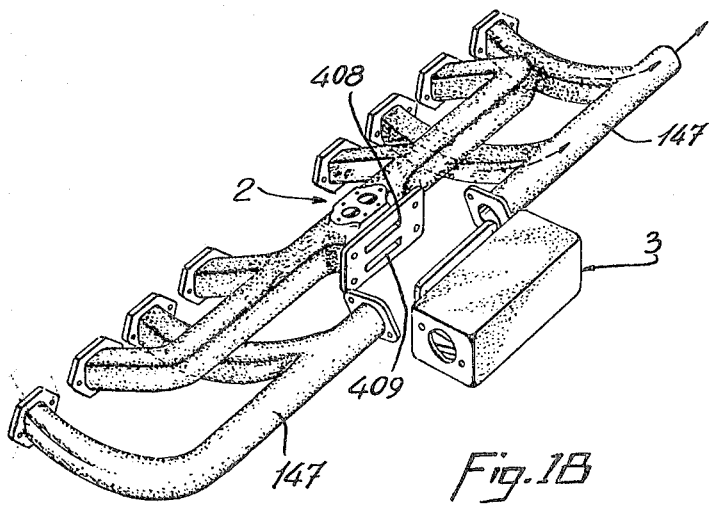
FIG. 18 is a perspective view of the installation of a heat exchanger used in my carburation system for a motor having four cylinders arranged in line.

The first sheet of drawings comprises FIGS. 1, 2 and 11, the second sheet illustrates FIGS. 3, 4, and 5, the third sheet shows FIGS. 6, 7, 8, 9, 10 and 12, while FIGS. 13 and 14 will be found on the fourth sheet of drawings. FIGS. 15 and 16 are in the fifth sheet, and FIGS. 17 and 18 are in the sixth sheet.

Referring first of all to FIG. 2, the improved carburetor according to my invention comprises a solid body 1 which is intended to be mounted in known manner between a heat exchanger 3, which is part of this system and an air filter, non-illustrated. The body 1 of the carburetor is mounted on the exchanger 3 by disposing therebetween a thermic insulated material (not illustrated) to protect the body 1.

As particularly shown in FIG. 4 and 5, the body 1 is bored with a number of carburation chambers 7 which is equal to the number of motor-cylinders of the motor to which it is intended. The carburation chambers 7 of the carburetor will be disposed on each side of a median plane 305 which extends through the body of the carburetor and will be disposed in a symetrical position with respect to the median plane 305. See FIG. 4. Each chamber is provided with a conventional butterfly valve for controlling the admission of air. At the center of the body 1 there is a reservoir 11 which opens on the face which is adjacent to the air filter (not illustrated) and which is hermetically closed by a sealing cover 13 which is kept in place by any known means such as screws 15. This reservoir 11 is fed and maintained under constant pressure by a fuel pump which feeds the fuel through an adjustable pressure regulator.

Referring more particularly to FIGS. 4 and 5, it will be seen that each carburation chamber 7 will be divided into two parts in the direction of the penetration of air immediately under the butterfly valves 9, by means of a partition 301. The net result is that inside each carburation chamber 7 there will be two compartments A and B which will be independent from one another. The dimension ratio of these two compartments of the carburation chamber will preferably be predetermined and will obviously be dependent on a certain number of parameters which are well known in the art.

Inside each carburation chamber 7, the partition 301 is parallel to the median plane 305 and it is perpendicular to the pivot axis 63 of the air admission butterfly valves 9.

In each carburation chamber, a half-circular flap 303 is pivotally mounted on the partition 301. Because of their particular position, these flaps will control the quantity of air which will pass into the compartments A and B of each carburation chamber. The disposition of the compartments A and B, as well as the position of the half-circular flap will be identical in each carburation chamber 7 on one side of the median plane 305 but they will have a symetrical position in the carburation chambers which are on the other side of the median plane.

Many possibilities could of course be foreseen with respect to the position of the half-circular flaps 303. However, if reference is made to FIG. 6, it will be seen that the latters will be mounted in known manner to oscillate on either side of the axial plane defined by the partition 301 always forming an obtuse angle $\alpha$ or $\beta$ with the partition 301.

However, preferably, the half-circular flaps will have a different position with respect to the flap 303 and they will thereafter be referred to by reference no. 303'.

These flaps 303' will be mounted to oscillate between a first position illustrated in FIG. 12, where they form a right angle with the partition 301 and an extreme position where the angle which a half-circular flap 303' could form with the partitions 301 will become practically 0. It will therefore be seen that according to the position of the half-circular flaps 303', the latters will regularize the quantity of air which will pass in one or the other of the compartments A and B of each carburation chamber 7, and this will be made possible by means of a mechanism which will be explained latter.

More specifically, the half-circular flaps 303' will be fixedly mounted on two pivot axis 203 one being provided on each side of the median plane 305 of the carburetor. These axes extend through the row of carburation chambers 7 along the partitions 301 which separate compartments A and B, in order that the half-circular flaps 303' be placed in compartments A of each carburation chamber.

In each carburation chamber 7 the compartment B will be disposed towards the exterior, while compartment A will be placed towards the interior adjacent to the median plane 305.

We shall now describe the heat exchanger 3.

The latter comprises a body 101 having the shape of an upright prism. It is designed to receive eight independent feeds and also to be used with eight motor cylinders.

The body 101 has been bored and divided into two equal parts by means of a longitudinal partitions 105. The upper wall 107 is formed with eight half-circular openings 307 and eight other half-circular openings 309 and the bottom portion 110 also has eight half-circular openings 311 and eight other half-circular openings 313. It will be noted that only one of the openings 301 as well as only one of the openings 313 has been illustrated in FIG. 2. It will also be noted that each opening 311 corresponds to an opening 307 while each of the openings 313 correspond to an opening 309. The openings 307 correspond to heat exchange compartments 113 (FIGS. 11 and 12) of zigzag shape and which are independent from one another, while each opening 309 will define a continuous path with an air duct which extends through the heat exchanger.

These compartments 113 are obtained, for example, by means of small plates 115 which are arranged as horizontal V inserted into one another as shown in FIGS. 11 and 12. Vertical partitions 117, disposed on either side of the openings 307, define with the partition 315 and a front wall 119, the above-mentioned independent compartments 113. In order to obtain a maximum yield with the exchanger and to prevent any condensation of the fuel of the mixture during its passage into the exchanger, the front wall 19 is mounted spaced from the adjacent side 121 of the body 101 of the exchanger thus forming a rectangular passage 123 for the hot gases, as will be explained below.

Two end partitions 117' having the general shape of a W lining down, close the end compartments 113. Therefore, the net result is that the compartments 113 define transverse passages in zigzag shape which are continuous between the entrance 109 and the outlets 111 of the fuel mixtures; these passages being separated by longitudinal triangular passages 125.

As will clearly be seen in FIG. 11, the end partitions 117' are preferably spaced from the ends 127 of the body 101 thus defining inlet and outlet chambers 128 and 130 for the hot gases. When a V8 motor is used, wherein the heat exchanger is divided into two parts, the hot exhaust gases of the motor are received, on one side, in inlet chamber 128 and thereafter pass through longitudinal triangular passages 125 for heating and evaporating the fuel whose mixtures flows in the compartment 113. The same process is applied on the other side of the exchanger but in reverse direction, the exhaust gases exiting from the outlet chamber 113 as shown in FIG. 1.

On the other hand, it will clearly be seen that the space defined by the central wall 105, the partition 315, (FIG. 2), will define a duct enabling the air of the compartment A of the carburation chamber 7 to pass directly into the admission block 135 without being heated by the heat exchanger.

The net result will be a heat exchanger 3 connected to the carburetor 1 in which, for each carburation chamber of the carburetor, there will be two compartments which are independent from one another and which are intended to respectively join compartments A and B of the carburation chamber and an admission chamber of the admission system 135 to the motor cylinders.

The resume, the compartment 317 will therefore become some kind of passage, by extending through the heat exchanger to directly connect the compartment A of the carburation chamber through the admission system 135 to the motor-cylinders.

The other compartment, in the shape of zigzag, will constitute the heat exchanger per se, in which the motor fuel and the air originating from the compartment B or the carburation chamber will be converted into a mixture of motor fuel vapour and air intended to the admission of the motor cylinders.

It will therefore be seen that the compartment A of each carburation chamber 7 defines a continuity with an air duct 317 and that the compartment B defines a continuity with a compartment 113 of the heat exchanger of the exchanger 3.

Referring to FIG. 2, it will be seen that the carburation system according to my invention is provided with an admission block 135 which bridges the exchanger 3 and the heads of the motor-cylinders.

The admission block is fixed in known manner to the head of the motor and on the other hand, it receives the exchanger 3 which is mounted thereon by means of bolts 141. The block comprises admission chambers 141 which are independent from one another and which are equal in number to the number of motor-cylinders. Each admission chamber (two of these chambers are illustrated in symetrical position on FIG. 2) receives from duct 317 and a compartment 113 of the heat exchanger via opening 144 the product of a carburation chamber 7, to be used in a motor-cylinder to which the product is intended.

The carburetor 1 comprises two independent circuits, one being a primary circuit which is fed by a motor fuel variable flow valve, so-called acceleration valve, which opens via channels 29 into compartment B of each carburation chamber 7, and a secondary circuit which is fed by at least one intermittent function valve and which opens in the compartment A.

The acceleration valve 19 comprises a cyclindrical casing 21 which is removably mounted in a pit 23 formed at the bottom of the reservoir 11 and projecting to some extent inside the reservoir. A number of apertures 25 are provided through the casing 21. It being understood that there is one aperture for each chamber 7 as will be explained more in detail hereinafter. These apertures have the shape of slots which are elongated axially with respect to the casing 21. Finally, a hollow piston 27 is slidably mounted inside the casing 21, this piston being opened at both ends thereof. Being so constructed, it will easily be understood, particularly with reference to FIG. 3, that the sliding of the piston 27 permits an adjustment of the opening of the aperture 25. Moreover, the elongated shaped of these slots will allow a much more precise adjustment of their opening during the travel of the piston 25. Finally, the latter is hollow and opened at both ends thereof and the apertures 25 will enable the motor fuel to escape under pressure from the reservoir 11 in a quantity which is proportional to the size of the opening of the aperture 25.

With reference to FIG. 3, the case 73 comprises a rod 67 which is threaded at its lower end into a support in the form of a cross which is solid with the piston 27 of the acceleration valve 19. The rod has a head 71 which is provided with a screwdriver's slot to enable an adjustment of the piston 27 to any depth required in the casing 21 thus obtaining a minimum opening of the apertures 25 during idling conditions.

The rod 67 slides in a case 73 and is maintained somewhat resiliently therein by means of the spring 75 between the case and the head 71. One face of the case 73 is toothed and meshes with the pinion 66.

With reference to FIG. 14, the pinion 66 is fixedly mounted on a pivot axis which axis is directly operated by the acceleration pedal.

The primary circuit also comprises a network of channels which is better illustrated in FIG. 4. Each channel 29 starts from the casing 21 and ends up in the compartment B of each chamber 7 so that it will be sufficient to describe one of them only. As illustrated in FIG. 3, each channel 29 has a generally rectangular section in which one end is enlarged to be suitably dimensioned to the approximate size of the corresponding aperture 25.

The secondary circuit comprises to intermittently operating automatic valves 31, 33 which have the sahpe of a cylinder open at the end corresponding to the reservoir 13. These valves slide in borings which are bored in the body 1 of the carburetor. The walls of the valves 31 and 33 are provided with openings, which in the open position of the valves, communicate with a network of channels 35 thus allowing to bring an excess of motor fuel via compartments A directly to the motor cylinders.

This network is formed on the ducts 36, 37 which respectively run from valves 31, 33, to duct 35.

The carburation system described above operates in the following manner.

During acceleration, the orifices in the shape of slots, are more or less obstructed to regularize the flow of motor fuel towards the compartments B of each carburation chamber 7.

A mechanism in which the operation will be dependent on the acceleration valve 19, simultaneously connects all the air admission butterfly valves 9 to induce them into a synchronized action, thus enabling each carburation chamber 7 to produce at the same time a mixture of motor fuel and air having a constant volume ratio under any operating condition of the motor.

As it was stated above, for each carburation chamber 7, the acceleration valve 19 discharges the motor fuel in the compartment B which corresponds to the heat exchange compartment 113, while the air which the air admission butterfly valve 9 allows to enter will be introduced through the two compartments A and B of the carburation chamber.

A mechanism which is controlled by a thermostat which is dependent on the temperature of the mixture of motor fuel vapour and air which is formed in the system of admission to the motor cylinders, adjusts the position of the half-circular flap 303 mounted on the partition 301 which separates the two compartments A and B in which carburation chamber 7 to regularize the quantity of air which penetrates to the heat exchange compartments with the motor fuel which will be transformed into vapour.

In this manner, under constant operating conditions, each motor cylinder will receive and ideally volumetric amount of a mixture of motor fuel vapour and air, at a moderate temperature.

With reference to FIG. 7, there is shown a mechanism with automatic control which is being called upon to synchronize the action of the flaps 303', thus enabling to regularize simultaneously and with the same precision, the quantity of air which will pass in both compartments A and B of each carburation chamber 7. This mechanism is made of a control rod 205 which is constructed to move axially between extreme positions which are determined by adjustable nuts 221, 221' between which a stopper 223 is displaced.

The mechanism also comprises a thermostat in the form of a coil spring 219 which is attached to a support 206 and which is connected to the control rod 205 in order to axially move the latter depending on the temperature variations registered by the thermostat 219. The control rod 205 carries at its portion a transverse element 215 which is mounted on the control rod 205 between two hexagonal nuts 217 in the manner illustrated in FIG. 7. The mechanism also comprises a first pair of levers 209 and a second pair of levers 207. Each of the levers 209 is articulated at one end of the transverse element 215 while being also articulated to a corresponding lever 207 in the manner illustrated in FIG. 7. Each of the levers 207 is finally connected to a corresponding axis 203 which as a result of its rotation causes pivoting of the half-circular flaps 303' in the direction indicated by the arrows 407 and 407'. It is understood that the articulations 211 and 213 are not fixed which in the end means that an axial displacement of the control rod 205 will produce a displacement of the articulations 211 and 213 thus producing a rotation of the axis 203 in one direction while the reverse axial displacement will cause a rotation of the axis 203 in opposite direction.

Consequently, it will be seen that this mechanism will be operated by the thermostat 219 in such a manner that it will be dependent on the temperature of the mixture which is introduced into the combustion chambers located in the admission chamber to the motor cylinders.

When starting the motor, the air which is introduced into the combustion chambers is obviously cold. Consequently, the thermostat 219 operates on the mechanism in order that the flaps prevent the air from passing into the compartments A of each carburation chamber. It should be noted however that the flaps 303' should not completely prevent the passage of the air but should only oppose a higher resistance when the motor is cold in order to enable the air to pass mainly in the compartment B which corresponds to a compartment of the heat exchanger 113.

As the temperature of the air is colder, the pressure which is exerted by the thermostat 219 will be higher thus forcing a larger quantity of air to pass into the compartments B of each carburation chamber 7, meeting with the corresponding compartments 113 of the heat exchanger 3.

When the motor is cold, the valve 31 which is controlled by a thermostat will insure the arrival of an excess of motor fuel in the compartments A of the carburation chamber 7 until the heat exchange compartment 113 again become functional.

When the motor operates, the air which passes through the heat exchange compartments 113 which we have described above, becomes more and more hot and the motor fuel which passes along the air and which is fed by the acceleration valve starts to evaporate before being introduced into a combustion chamber.

The pressure which is exerted by the thermostat 219 descreases slowly; when the temperature of the mixture which is introduced into the combustion chambers has reached the maximum specified temperature, the thermostat 19 will be completely relaxed and the flaps 303' will open to allow free passage to the air inside the compartments A.

It will be seen that the primary circuit of the carburetor which is fed by the acceleration valve 19 will end in the compartment B of the carburation chamber 7 by means of the channels 29. With respect to the secondary circuit, the latter will lead into the compartment A of the carburation chamber 7 by following channel 35.

Obviously, the amount of motor fuel which is fed by the acceleration valve in the primary circuit which ends up in the compartment B of the carburation chamber 7 will have a constant volume ratio under any operating conditions of the motor with respect to the quantity of air which is allowed to pass by the air admission butterfly valve 9 and which passes in the two compartments A and B of the carburation chamber 7.

In this manner, as it exists from the heat exchanger 3, the mixture of motor fuel vapour and air will have a volume ratio which is ideal and which will be at a moderate temperature when being introduced into the combustion chamber.

The secondary circuit which is carried to the carburation chamber 7 via channel 35 will be controlled by two valves 31 and 33 which are mounted in parallel, and which will serve to introduce an excess of motor fuel to the motor cylinders, according to the needs. This secondary circuit will be introduced in the compartment A of the carburation chamber 7. The flow of each valve will be individually controlled by means of conventional flow control screws 38, (FIG. 3), which are easily adjustable at any time.

With respect to the valve 31, the latter is controlled by thermostat.

Concerning valve 33, the latter is a solenoid electrical type and a description will now be made with reference to FIGS. 8, 9, 10 and 11.

With reference to FIGS. 15, there is provided a mechanism which synchronizes the action of the air admission butterfly valves and of said acceleration valve in order to produce a flow of motor fuel and oil which has a constant volume ratio.

During a sudden acceleration, the air will have a tendency to pass at a faster speed than the formation of the vapour of motor fuel. In order to prevent that the mixture of motor fuel vapour and air which is introduced into the motor contain a larger quantity of air than is necessary, which will cause the motor to choke during the acceleration, the following mechanism is provided.

With reference to FIG. 11, it will be seen that the circuit including the solenoid 225 will be controlled by a mechanism 237 (FIG. 8) so that during acceleration where the mixture of motor fuel vapour and air has a tendency to contain more air is necessary, the solenoid will cause an opening of the valve 33 and will maintain the latter open until the mixture has again reached equilibrium. The mechanism in question 237 is a choke which is made of an oil bath 239. The choke is connected to an acceleration arm 233 by means of a lever 259 which is articulated on the acceleration arm 233. Also, there is a control lever 247 having at one of its end a slowing down member 245 which is inside the oil bath 239. The slowing down member 245 is provided with a valve 246 which enables the lever 259 and the lever 247 to move rapidly in the direction indicated by arrow 248 in FIG. 10 during a sudden acceleration. In the higher position of the control lever 247 illustrated in dotted line in FIG. 9, the valve 246 will close again which will force the lever 247 to very slowly come down in the direction indicated by arrow 240 in FIG. 9 thus enabling the solenoid 225 to be active for still a few moments in order that the mixture of motor fuel vapour and air be again in equilibrium. It will also be noted that the mechanism comprises a spring 249 which rests on the lever 259 and on the lever 247 forcing the latter to produce a contact with the circuit for opening it. When pushing down on the accelerator, the control lever is immediately disengaged to close the circuit and to allow the solenoid 225 to open the valve 33. The control lever 245 will be slowed down in its return in contact with the circuit as mentioned above, by means of the member 245 which is in the oil bath 239. The valve will remain open long enough to re-establish the equilibrium in the mixture of motor fuel vapour and air.

It will also be noted that the oil bath contains partitions 241 which enable the oil to be moved in the direction indicated by the arrows $u, v, x, y$ when the control lever 247 is down on the contact 227.

By rapidly pushing down on the accelerator, the choke will free the switch and when the contact is closed again, it will close the electrical circuit. As a consequence, the value will be opened by the energization of the solenoid thus producing an excess of fuel in the motor cylinder by means of the secondary circuit until the control lever 247 is again down on the contact 227. When the accelerator has again returned to normal, the choke will slowly expand to rest on the switch 227. The contact will open, the solenoid will be de-energized and the valve will close. So, this mechanism will maintain the valve open as long as the volume ratio of the mixture of motor fuel vapour and air has not returned to normal at the entrance of the combustion chamber.

Canadian Pat. No. 951,200 mentions that with respect to the primary circuit, the carburetor is provided with a control mechanism which is simultaneously connected to all the butterfly valve 9 and to the acceleration valve 19.

The modified mechanism which is illustrated in FIGS. 13 and 14 comprises a first toothed rack 319 which is connected to the motor fuel variable flow valve 19 by means of a gear system and which is slidably mounted in the body of the carburetor 1 as will be seen in FIG. 13.

A pinion 61 is fixedly mounted at one end of each pivot axis 63 which carry the air admission butterfly valves 9. These pinions 61 mesh with a second toothed rack 321 which is slidably mounted in the body 1 of the carburetor in parallel with the first toothed rack 319, in order that the toothed rack 319 and 321 be moveable with respect to one another.

The second toothed rack 321 is connected to a spring 323 and to a choke 325 intended to slow down the traction of the spring 323 when the toothed rack 321 is liberated from the toothed 319 as will be seen later.

The first toothed rack 319 is provided with an abutment 327 and the second toothed rack 321 is provided with an abutment 329; as will be seen in FIGS. 13 and 14, these two abutments 327, 329 are adapted to abut one another in normal operation of the motor. Finally, it will be seen that the spring is hooked on the body of the carburetor at 331 and on the second toothed rack at 333.

It will be noted that the toothed rack 319 will be immediately moved in the direction indicated by the arrow 335 under a sudden acceleration while the second toothed rack 321 will be slowed down in its displacement in the same direction as the toothed rack 319 by means of the choke 325.

To summarize, in order to prevent that the mixture of motor fuel vapour and air which is introduced into the motor cylinders contains a higher quantity of air than is necessary as a result of a sudden acceleration, the device which has thus just been described, will eliminate the necessity of injecting an excess of motor fuel to the motor cylinders. Instead it proposes to slow down the opening of the air admission butterfly valves 9 with respect to the adjustment of the opening of the motor fuel variable flow valve 19, which is directly controlled by the acceleration pedal.

Consequently, under the effect of a sudden acceleration the motor fuel variable flow valve 19 will automatically adjust the opening of the orifices 25 in the form of slots, according to the position of the acceleration pedal, thus producing a discharge of a larger quantity of motor fuel, which is intended to be evaporated in the heat exchange compartments 113, while the second toothed rack 321 which synchronizes the movement of the air admission butterfly valves 9, with the aid of the adjustable choke 325 will slow down the opening of these butterfly valves 9.

When the abutment 329 of the second toothed rack 321 abuts the abutment 327 of the first toothed rack 319, the mixture of motor fuel vapour in air at the exit of the heat exchange 3 will again be in a ideal volume ratio.

In this manner there will be obtained a sudden rise of the running of the motor, which does not require the injection of an excess of fuel during the acceleration as in the preceeding case.

Reference will again be made to FIG. 15, where there is provided a control mechanism which is simultaneously connected to all the butterfly valves 9 and to the motor fuel variable flow valve 19 in order to obtain a synchronized action enabling an adjustment, in one single operation, of the flow of air and of motor fuel in the carburation chambers 7, thus realizing a desired and constant ratio at all time.

FIG. 16 illustrates the fuel pump which feeds the carburetor, as originating from the reservoir (not illustrated) by the supply 2 which is divided in two to feed into the two inlets 4 and 4' of the body 6 of the twin pump also provided with two outlets 8 and 8'. The body 6 has two chambers 10, 10', in which are mounted diaphragms 12, 12' which are acted upon by springs 14, 14', the inlets 4, 4' and the outlets 8, 8' of each chamber 10, 10' are controlled by unidirectional valves 16, 16', for the chamber 10, and 18, 18', for chamber 10', these valves operating as illustrated, in reverse direction. The diaphragms 12, 12' are operated by pushing members 20, 20' which are acted upon by a common level 22 the latter being oscillated by a shaft 24 provided with a flap 26 acting at one end while the other end is applied on the extremities of the pushing members 20, 20'. The shaft 24 is obviously operated by the motor itself.

In this description, it will easily be understood that when the shaft 24 rotates, one of the diaphragms 12, 12' has a sucking action while the other drives back in the duct 26 connected to the reservoir of the carburetor through an adjustable pressure regulator RP. By means of this twin pump, it is possible to eliminate in this manner the pulsations of the flow of feed. The regulator RP, enables to regulate the pressure inside the reservoir 11 of the carburetor.

Referring to FIG. 17, it will be seen that the pressure regulator RP has an adjustment 400 and is connected by a control 401 to automatic or manual control means (not illustrated). As a matter of fact, it is important that said control means enable to vary the pressure inside the reservoir 11 of the carburetor 1 depending on whether the motor is cold or hot, more specifically, whether the duct 113 of the heat exchange 3 is cold or sufficiently hot to cause evaporation of the quantity of fuel supplied by the motor fuel variable flow valve 19 and which passes through the said duct 113.

In a carburation system for internal combustion motor, when the motor is cold, it requires a larger quantity of motor fuel than when it is hot. It would be more exact to say that the volume of the quantity of motor fuel in the combustible mixture can be decreased by improving the vaporization of the motor fuel. Then, the best possible vaporization is still obtained by transforming the motor fuel into vapor.

Previously, in the operation of my carburetor, I have indicated that a mechanism automatically adjusts the opening of the butterfly valves 9 for admitting air with respect to the opening of the motor fuel variable flow valve 19 to enable each carburation chamber to produce a flow in which the mixture has a constant volume ratio of motor fuel and air for each running of the motor, — with respect to a given pressure— but it should be reminded that the flow of motor fuel can be varied with respect to a constant opening of a valve by increasing or decreasing the pressure of the fuel inside the reservoir 11 of the carburetor 1.

Consequently, upon ignition, when the heat exchange 3 is cold, the pressure inside the reservoir 11 of the carburetor 1 should be higher and should decrease as the duct 113 of the heat exchanger 3 is heated up to be stabilized at a minimum predetermined pressure, when said duct 113 will be sufficiently hot to be functional. The minimum pressure inside the reservoir 11 of the carburetor 1 is adjustable depending on the altitude where the motor will be called upon to operate. In a motor car, the adjustment 400 of the pressure regulator RP can be connected to automatic control means (not illustrated) to vary the minimum pressure inside the reservoir 11 of the carburetor depending on the atmospheric pressure.

The ideal combustible mixture at the inlet of the motor-cylinders is made up of about 32% motor fuel vapor and 68% air. Any excess quantity of motor fuel would become a pure loss with respect to power, since the air of the combustible mixture does not contain enough oxygen to burn the excess.

Up to now we have described a carburation system which ensure an individual feeding to each motor-cylinder, but the same carburation system can be realized in a manner which is much more simple.

With reference to FIG. 17, there is illustrated the carburation system in its entirety, in its simplest aspect, while it is intended to feed a plurality of motor-cylinders. The body of the carburetor 1 is provided with a single carburation chamber 7 and also defines a motor fuel reservoir 11. The carburation chamber is provided with an air admission butterfly valve 9.

The carburation chamber 7, underneath the air admission control 9 is divided into two parts, in a longitudinal plane of the carburation chamber 7, by means of a partition according to a predetermined dimension ratio, to form inside the chamber 7 two compartments A and B which are independent of one another.

The reservoir 11 of the carburetor is fed by a fuel pump which is kept under constant pressure, through an adjustable pressure regulator RP, enabling to vary the pressure inside said reservoir 11, as it has been mentioned above.

The carburation chamber 7 operates in the same manner as one of the carburation chambers described in the previous system.

Consequently, a motor fuel variable flow valve 19 feeds the compartment B of the chamber 7 from the reservoir 11, and this valve operates to supply the quantity of motor fuel necessary for each running of the motor.

A valve which operates intermittently is mounted in the reservoir 11 of the carburetor and feeds the compartment A of the chamber 7. This valve will supply the excess of motor fuel necessary to the ignition by cold weather or when the motor is cold.

A mechanism automatically adjusts the opening of the air admission butterfly valve 9 with respect to the opening of the motor fuel variable flow valve 19, to make sure that the carburation chamber 7 produces a flow in which the mixture has a relatively constant volume ratio of fuel and air at each running of the motor.

For example, let us point out a modification of the mechanism which is illustrated in FIG. 14 according to which the opening of the air admission butterfly valve 9 will be slowed down by an hydraulic or automatic choke with respect to the opening of the motor fuel variable flow valve 19, which valve 19 is directly operated by an acceleration device; when the adjustment of the opening of the said valve 19 is stabilized, the opening of the air admission butterfly valve 9, is automatically adjusted to produce a constant volume ratio of air and motor fuel, at all runnings of the motor.

The other possibility is the adaptation of the mechanism illustrated in FIG. 14 according to which a control mechanism is simultaneously connected to the air admission butterfly valve 9 and to the motor fuel variable flow valve 19, in order to obtain a synchronized action permitting to realize the adjustment in a single operation of the air flow and of the motor fuel, thus making sure that there is a constant volume ratio of the components of the motor fuel-air mixture even during acceleration, while preventing that during a sudden acceleration the explosive mixture which is received by the motor-cylinders be in desequilibrium in favor of air, as pointed out previously.

There is also provided a valve operating intermittently and which also pours into a compartment A of chamber 7. This valve is operated by an automatic control mechanism during the acceleration and it operates only during a few seconds.

With reference again to FIG. 17, illustrating the mounting of the carburetor 1 between the network of the admission system 2 and a heat exchanger 3, there is illustrated in the upper part of the admission system 2 two adjacent openings which each corresponds with a passage:

the first opening corresponds to passage 307 which directly opens in the admission system 2, and the second opening corresponds to the passage 408, which branches out towards the outside, thus being in a contiguous position with the first section of the duct 113 of the heat exchanger 3. The last section of the duct 113 is connected to the passage 409 which is made in the lower portion of the admission system 2.

Of course, the exchanger 3 is heated by the combustion gases which pass in the passages 125 surrounding the duct 113. The carburetor 1, which is separated by a thermic insulator 12 is fixedly mounted on the admission system 2 in order that the openings of the passages 307 and 408 will be in contiguous positions, respectively with the compartments A and B of the carburation chamber 7.

Consequently, the compartment A of the carburation chamber 7 which is fed by at least one valve operating intermittently according to needs, directly corresponds to the admission system 2 by means of the passage 307, while the compartment B which is supplied by the motor fuel variable flow valve 19 discharges the motor fuel in the duct 113 of the heat exchanger by means of the passage 408.

The air which the butterfly valve 9 allows to pass in constant volumetric quantity with respect to the quantity of motor fuel supplied by the motor fuel variable flow valve 19 for each running of the motor will pass in the two compartments A and B of the chamber 7, in well defined proportions which will be explained later.

In order to decrease the power losses of the explosion in the motor-cylinders, resulting from the prematured dilatation of the air which pass with the fuel in the duct of the heat exchanger, the carburation system is provided with control means to regularize the porportion of the quantities of air which pass in the duct of the heat exchanger and the direct passage towards the motor-cylinders.

An automatic control mechanism adjusts the position and the action of these control means, depending on the temperature of the combustible mixture at the inlet of the motor-cylinders.

According to FIG. 17, these control means are mounted in the carburation chamber and operate in the same manner as explained above with reference to FIG. 12.

Consequently, a flap 303' is mounted on a pivot is 303 which extends through the carburation chamber 7 along the partition separating the compartments A and B of the carburation chamber 7, so that the flap 303' will pivot in the compartment A between a first position where it forms a right angle with the partition and an extreme position where the angle which it will form with the partition will gradually become zero.

An adaptation of the control mechanism described in FIG. 7 will enable to adjust the position of the flap 303' depending on the temperature of the combustible mixture at the inlet of the motor-cylinders.

Upon ignition, when the combustible mixture which penetrates in the motor-cylinders is cold, the thermostat 219 which is mounted in the admission system 2 acts on the control mechanism in order that the flap 303' closes the passage to the air in the compartment A of the chamber 7.

It should be noted however that the flap 303' should not prevent the air from passing in said compartment A.

On the contrary, it should only oppose a greater resistance to its passage, thus forcing the air to pass mainly in compartment B of the chamber 7. As the combustible mixture becomes warmer at the inlet to the motor-cylinders, the thermostat 219 releases the pressure which is exerted, and when the combustible mixture has reached the maximum predetermined temperature, the flap will allow free passage to the air in the compartment A of the chamber 7.

The evaporation of the fuel during its passage in the heat exchange duct 113 forms a deposit, which should periodically be removed.

For this purpose, the heat exchange 3 is made of a single distinct member, which is independent of the system for admitting and exhausting the gases 147. So it can easily be removed to be cleaned, without moving the carburetor and the admission or exhaust system.

With reference to FIG. 18, which represents the admission and exhaust system 147 of four cylinders in line motor, one can easily see the removable body of a heat exchanger 3; in this manner it can easily be foreseen how to mount the said heat exchanger 3.

Another possibility which can be noted in FIG. 18, is the fact that the system can receive a carburetor having two carburation chambers 7, while the body of the heat exchanger 3 has only one heat exchange duct 113. Consequently, the first section receives the motor fuel, accompanied by a certain quantity of air, from the compartment B of each carburation chamber by means of duct 408, and the last section of the said duct 113 discharges a mixture of motor fuel vapor and air in the admission system 2 by means of the passages 409.

It would be too long to list all the possibilities which would stem from the specific embodiment of my carburation system, but in general it can be said that in a carburation system for internal combustion motor, wherein the motor-cylinders are placed in line and the carburetor which supplies the motor is provided with more than one carburation chamber, the carburetor is characterized by the fact that:

the arrangement of the carburation chambers as well as their operation is identical whether the carburation chambers are on the same side of a median plane 305 previously described according to FIGS. 2 to 15.

Consequently the carburation chambers 7 are placed in line and the compartments A of the carburation chambers define a row on the motor side and are in contiguous position with passages connected to an admission system, while in adjacent position, the compartments B which are supplied by the motor fuel variable flow valve 19 will have an ideal position to mount a removable heat exchanger 3 which can be easily removed, without moving the carburetor, or other elements of the admission system 2 and of the exhaust system.

Obviously, any modifications may be made to the specific embodiment described above by way of example only without departing from the spirit of the invention which should only be restricted by the annexed claims.

I claim:

1. Carburation system for internal combustion motor operating with a mixture of fuel vapor and air, said system in its simplest aspect being provided with a carburetor operating in the characteristic manner of an injection system, said carburation system having only one carburation chamber and one fuel reservoir, said carburation chamber being provided with means to control admission of air, said carburation system being characterized in that:

the carburation chamber, below the means for controlling the admission of air is doubled according to a predetermined dimension ratio thus forming two compartments which are independent of one another each having a different function but operating together to enable carburation;

the reservoir of the carburetor is fed by a fuel pump under constant pressure, through an adjustable pressure regulator, enabling to vary the pressure inside the said reservoir so that for a given pressure and independently of the depression exerted by the motor-cylinders on the carburation chamber, the flow of fuel is regularized by adjusting the opening of valves mounted in said reservoir or in communication with the latter;

the pressure regulator is connected to control means enabling to vary the pressure inside the reservoir of the carburetor depending on the behavior of the motor;

a motor fuel variable flow valve feeding the first of the two compartments of the carburation chamber, said valve operating to supply the quantity of the fuel required for all the operating conditions of the motor;

controlled valve operating intermittently feeding into the second compartment of the carburation chamber so that said valve can supply an excess of fuel necessary for starting the motor when it is cold;

means to automatically adjust the opening of the air admission butterfly valve with respect to the opening of said variable flow fuel valve, so as for a given pressure to enable the carburation chamber to introduce a flow of vapor fuel and air having a relatively constant volume ratio under all operating conditions of the motor;

a heat exchanger connected downstream to said carburetor, said heat exchanger and said carburetor being separated by a high-performance thermic insulator, said heat exchanger comprising a body provided with a heat exchange duct, connecting said first compartment of the carburation chamber to the motor-cylinders, means to bring the combustion gases around said heat exchanger duct to heat the heat exchanger, in order that the fuel supplied by the motor fuel variable flow valve when said fuel passes through said duct can be converted into vapor;

the body of said heat exchanger is unitary and removable in order to be easily removed to exchange it or to carry a periodic cleaning;

an unheated passage connecting said compartment of the carburation chamber with the motor-cylinders;

in order to decrease the power losses of the explosion in the motor-cylinders resulting from the prematured dilatation of the air which passes along with the fuel in the heat exchange duct, said heat exchanger being provided with control means to regularize the proportion of the quantities of air which pass in the heat exchange duct and the direct passage towards the motor-cylinders;

and automatically operated means to adjust the position and the action of said control means depending on the temperature of the combustible mixture at the inlet of the motor-cylinders.

2. A carburation system which enables each motor-cylinder to have its own carburation which is distinct and independent from that of the other motor-cylinders, said system being characterized in that:

a carburetor is provided with a number of carburation chambers which is equal to the number of motor-cylinders of the motor to which it is intended and said motor is provided with a fuel reservoir, each chamber having means to control the admission of air such as conventional butterfly valves;

the fuel reservoir is fed by a fuel pump operating under constant pressure through an adjustable pressure regulator, enabling to vary the pressure inside said reservoir;

the pressure regulator is connected to control means enabling to vary the pressure inside the reservoir of the carburator depending on the behaviour of the motor;

each carburation chamber of the carburator being divided into two parts, along longitudinal plane of said carburation chamber, so as to form inside the carburation chamber two compartments which are independent of one another;

each carburation chamber being provided with control means to regularize the proportion of the quantities of air which pass in both compartments of the carburation chamber;

automatic control means to synchronize in each carburation chamber the position and the action of said control means depending on the temperature of the combustible mixture at the inlet of the motor-cylinders;

a variable flow fuel valve individually feeding the first of the two compartments in each carburation chamber from the reservoir of the carburetor;

a first operated intermittent valve feeding the second compartment in each carburation chamber from said reservoir, said first valve enabling a flow of an excess of fuel which is required for starting the motor under cold conditions;

control means simultaneously connected to all the means for controlling the admission of air and to the motor fuel variable flow valve, in order to obtain a synchronized action, enabling to adjust in a single operation the flow of air and of fuel in the carburation chambers, thus producing a constant volume ratio of the components of the mixture of fuel and air;

a second intermittent valve which also feeds the second compartment in each carburation chamber, said second valve being connected to automatic control means to operate said second valve when a sudden acceleration takes place, in order to prevent the explosive mixture received by the motor-cylinders be in desequilibrium in favor of the air;

a heat exchanger mounted down-stream on said carburetor and comprising a body provided with independent heat exchange ducts, connecting said first compartment of said carburation chambers to each motor-cylinder;

means to bring the exhaust gases around the heat exchange ducts to heat the latter;

the body of the heat exchanger being made of a distinct and removable member, to enable an easy removal thereof in order to change it or to periodically clean it; and passages connecting the second compartment of the carburation chambers to each motor-cylinder.

3. A carburation system for internal combustion motor which enables each motor-cylinder to have its own carburation which is distinct and independent from that of the other motor-cylinders, said system being provided with a carburetor having a number of carburation chambers which is equal to the number of motor-cylinders of the motor to which it is intended, said carburetor being provided with a fuel reservoir, each carburation chamber having means to control the admission of air such as conventional butterfly valves, said carburation system being characterized in that:

the reservoir of the carburetor is fed by a fuel pump which feeds under constant pressure through an adjustable pressure regulator, enabling to vary the pressure inside the said reservoir;

the pressure regulator is connected to automatic or manual control means enabling to vary the pressure inside the reservoir of the carburetor, depending on whether the motor is cold or hot, more specifically, depending on whether a heat exchanger which is used in this carburation system is sufficiently cold or hot to be functional;

the carburation chambers of the carburetor, downstream of the means to control the admission of air are divided into two parts, in the direction of penetration of air, by means of a partition, according to a predetermined dimension ratio to form inside each carburation chamber two compartments which are independent of one another;

in each carburation chamber, a flap being pivotally mounted on the partition which divides the two compartments;

automatic control means synchronising the position of said flaps to regularize with the same precision the proportion of the quantities of air which pass in both compartments of each carburation chamber;

a motor fuel variable flow valve with a plurality of outlets, individually feeding the first of the two compartments in each carburation chamber from the reservoir of the carburetor, said valve also enabling the flow of the quantity of fuel necessary to maintain the motor idle;

a circuit for feeding the motor-cylinders, comprising channels connecting the first of said compartments in each carburation chamber to a fuel valve operating intermittently, mounted inside said reservoir of the carburetor or in communication with the latter; said fuel valve operating intermittently enabling a flow of an excess of fuel which is required to start the motor when the latter is cold;

means connecting all the means used to control the admission of air to make sure that the latter are synchronized, said means being also connected to automatic control means, said automatic control means, during a sudden acceleration being adapted to slow down the opening of the butterfly valves for the admission of air, with respect to the adjustment of the opening of the variable flow fuel valve, said variable flow fuel valve being directly operative by an acceleration device, and when the adjustment of the opening of said variable flow fuel valve is stabilized, the opening of the means controlling the admission of air is automatically adjusted to produce a constant volume ratio of air and of fuel under all operating conditions of the motor;

a heat exchanger being connected down-stream to said carburetor, said heat exchanger being separated by a high-performance heat insulating material comprising a body provided with an equal number of said heat exchange ducts and direct passages of combustible mixture, mounted in such a manner that a passage of the combustible mixture and a heat exchange duct respectively connect the second and the first of said compartments of each carburation chamber and a duct of an admission system to the motor-cylinders;

means to bring the combustion gases around the heat exchange ducts, so that said ducts directly connecting the second compartments of the carburation chamber to the motor-cylinders are not heated;

the body of said heat exchanger comprising a distinct and removable member.

4. A carburation system according to claim 3 wherein the carburation chambers are symetrically disposed on each side of a transverse median plane of said carburetor and that in each carburation chamber the partition which separates the two compartments is parallel to said median plane, so that the position of the two compartments according to their function in each carburation chamber as well as the position of the flap pivotally mounted on said partition will be identical in each of the carburation chambers which are on the same side of the median plane of the carburetor, but will be symetrical in the carburation chambers which are on the other side of said median plane.

5. A carburation system according to claim 4 wherein for each carburation chamber of the carburetor, the valves operating intermittently end in the compartment which is adjacent to said median plane while the other compartment of the same carburation chamber and which is located towards the exterior is fed by the variable flow fuel valve.

6. A carburation system according to claim 4 characterized by two pivot axes each extending through a row of carburation chambers and located on each side of the median plane of the carburetor, along the partition which separates the two compartments in each carburation chamber; said flap being half-circular and being mounted on said pivot axis in the same position in each carburation chamber on each side of said median plane, but being symetrical in the carburation chambers which are on the other side of said median plane.

7. A carburation system according to claim 3 wherein in each carburation chamber the pivot axis of the air admission butterfly valve is perpendicular to the median plane and to the partition which separates the two compartments.

8. A carburation system according to claim 6 characterized by the fact that said flap is mounted to oscillate on either side of the partition which separates the two compartments in each carburation chamber, by always forming an obtuse angle with said partition.

9. A carburation system according to claim 6 characterized by the fact that said flap is mounted to oscillate between a first position where it forms a right angle with the partition which separates the two compartments in each carburation chamber, and an extreme position where the angle which forms with said partition becomes substantially equal to zero.

10. A carburation system according to claim 9 characterized by the fact that said flap is mounted to oscillate in the compartment of each carburation chamber which forms a continuity with the direct passage of the heat exchanger.

11. A carburation system according to claim 6 characterized by the fact that it comprises a mechanism capable of causing an identical pivot of the flaps which are located on the same side of said median plane and to cause a reverse pivoting of those which are located on the other side of said median plane in order to define a perfect symetry of operation of the flaps on each side of the median plane.

12. A carburation system according to claim 11 characterized by the fact that said mechanism is made of a control rod carrying a transverse element, and capable of vertical displacment in the axis of said median plane of the carburetor, said rod being connected to a thermostat element which is mounted in the piping system of the admission system, a first and a second pair of levers together forming an articulated elbow which one is placed on each side of said median plane in order that an end of each pair of levers is articulatly mounted on said transverse element of the rod, while at the other end, each of said pairs is fixed on a pivot axis carrying the flaps.

13. A carburation system according to claim 3 in which a mechanism which synchronizes the movement and the action of the air admission butterfly valves is connected to a choke with an adjustable speed of expansion, said choke, during a sudden acceleration being adapted to slow down the opening of the air admission butterfly valves with respect to the adjustment of the opening of the motor fuel variable flow valve, said valve being directly operated by an acceleration device, and when the adjustment of the opening of said valve is stabilized, the opening of the air admission butterfly valve is automatically adjusted to produce a constant volumetric dosage of the air and of the motor fuel under all operating conditions of the motor.

14. A carburation system according to claim 13, including a control mechanism of the primary circuit comprising:
    a first toothed rack connected by means of a gear to the motor fuel variable flow valve and slideably mounted in the body of the carburetor;
    a pinion fixedly mounted at one end of each pivot axis which is fixed to the air admission butterfly valves, these pinions meshing with a second toothed rack slideably mounted in the body of the carburetor and parallel with the first toothed rack;
    said second toothed rack being also connected to a spring and an adjustable choke designed to slow down the sudden traction of the spring;
    the first toothed rack being provided with a first abutment and the second toothed rack being provided with a second abutment, these two abutments being adapted to abut one another in normal operation of the motor, the first toothed rack being immediately displaced under the effect of a sudden acceleration while the second toothed rack will be slowed down in its displacement in the same direction as the first toothed rack by said choke.

15. A carburation system according to claim 2 in which the opening of the motor fuel variable flow valve and the opening of the air admission butterfly valves are synchronized by a mechanism to obtain a flow in volume of motor fuel and air which is always constant; an automatically control mechanism is provided to enable the arrival of an excess of fuel during said acceleration and to make sure that the explosive mixture which is received by the motor-cylinders during a sudden acceleration of the motor is in equilibrium with respect to the air said mechanism comprising:
    an electrical solenoid type valve feeding said secondary feeding circuit of the motor cylinders;
    a switch normally closed, mounted on the carburetor and connected to said solenoid by means of an electrical circuit;
    an adjustable choke of pivoting type mounted on the pivot axis of the air admission butterfly valve or on the acceleration lever; said choke carrying a lever which rests on said switch.

16. A carburation system according to claim 2, in which the control mechanism which synchronizes the opening of the variable flow fuel valve and of the butterfly valves for admitting air, in order to obtain a constant volume ratio of fuel and air in each carburation chamber, is a pinion and gear system.

17. A carburation system according to claim 3, in which the mechanism which synchronizes the movement and the action of the butterfly valves for admitting air is a pignon and gear system.

18. A carburation system according to claim 1, in which the means for feeding the reservoir of the carburetor comprise, along the channel system leading to the reservoir, a twin fuel pump, of diaphragm type and of differed action, and an adjustable pressure regulator through which said pump operates.

19. A carburation system according to claim 2, in which the automatically control valve operating intermittently which operates during an acceleration, is of an electrical solenoid type.

20. A carburation system according to claim 3, in which the variable flow fuel valve is provided with means enabling to adjust a minimum opening of said valve, thus enabling a flow of fuel which is required for feeding the motor when the latter is idle.

21. A carburation system according to claim 1, in which the quantity of fuel required for feeding the motor while the latter is idle, is also fed into said first compartment of the carburation chamber which is connected with a duct of the heat exchanger.

22. A carburation system for internal combustion motor according to claim 1, wherein the motor-cylinders are in line, the carburator which feeds said motor having more than one carburation chamber, said carburator being characterized in that:
    the arrangement of the carburation chamber as well as their operation is identical, the carburation chambers are mounted on the same side of said median plan, of the carburetor.

23. A carburation system according to claim 22, in which the carburation chambers are in line and said second compartments of the carburation chambers define a row on one side of the motor and are contiguous with passages connected to a system of a admission, while in adjacent to position, said first compartments which are supplied by the variable flow fuel valve are ideally located to receive said heat exchanger which can easily be removed according to needs.

24. A carburation system according to claim 23, in which the body of said exchanger is made of a single distinct and removable member, said body being provided with a heat exchange duct which is heated by the combustion gases, said duct connecting the first compartment of the carburation chambers to said system of admission to the motor-cylinders.

25. A carburation system according to claim 3 wherein the body of the exchanger connected to the carburetor is provided with said equal number of heat exchanger ducts and of direct passages of combustible mixture, on the same side of a median plane, defined by a central partition in the exchanger, so that a passage of combustible mixture and a heat exchange duct is provided to connect a carburation chamber and an admission chamber to the motor cylinder to which it is intended; and the arrangement of these heat exchange ducts is such that the latters will be located towards the exterior, while the direct passages will be located towards the interior adjacent to the central partition in order that each direct passage defines a common side with said central partition on the one hand and an exchange duct on the other hand, thus forming a symetrical arrangement on both sides of the central partition, and in which the exhaust gases will be directed around the heat exchange ducts in two flows, one of each side of said central partition.

26. A carburation system according to claims 15 in which the direct passages are constructed in such a manner that they extend through the heat exchanger to define a direct connection each between a compartment of a carburation chamber in which compartment valve operating intermittently is discharged, and an admission chamber to the motor cylinder to which it is intended.

27. A system according to claim 25 in which each heat exchange duct is in the shape of a zigzag passage formed of at least four rectilinear sections of alternate reversed direction, first of said sections received the mixture of the first of said two compartments of a corresponding carburation chamber said first section being supplied by the motor fuel variable flow valve, and the last section discharging a mixture of motor fuel vapour and air in the admission chamber to the motor cylinder which corresponds to said duct.

28. A carburation system according to claim 25 in which the heat exchange ducts as well as the direct passages of the heat exchanger are individually provided and at one end thereof with a semi-circular opening and the semi-circular openings of the heat exchange duct and of the direct passage connected the same carburation chamber and the admission chamber are located in adjacent positions so that the two openings define a circle of identical dimension to that of the opening of the carburation chamber.

29. A carburation system according to claim 1, in which the butterfly valve for admitting air is connected to control means which slow down the opening of said butterfly valve with respect to the opening of the variable flow fuel valve, said valve being directly operated by an acceleration device, and when the adjustment of the opening of said valve is stabilized, the opening of the butterfly valve for admitting air is automatically adjusted to enable a constant volume ratio of air and fuel, under all operating conditions of the motor.

30. A carburation system according to claim 1, in which the control mechanism is simultaneously connected to the butterfly valve for admitting air and to the variable flow fuel valve, in order to obtain a synchronized action, enabling to at once adjust the flow of air and of fuel, thus permitting to have a constant volume ratio of the components of the mixture of motor fuel and air, during an acceleration.

31. A carburation system according to claim 30, comprising a second valve operating intermittently which also feeds into said second compartment of the carburation chamber, said second valve being operated by an automatic control mechanism during the acceleration, said valve operating only during a few seconds at the maximum.

32. In a carburation system for internal combustion motor operating with a mixture of fuel and air, said motor having a predetermined number of motor-cylinders and being provided with a carburetor having more than one carburation chamber, said carburation system being characterized by the fact that:

the carburator is adapted to operate as variable flow fuel injection system in which a reservoir of the carburetor is supplied by a fuel pump under constant pressure through an adjustable pressure regulator enabling to vary the pressure inside said reservoir, and that for a given pressure, and independently of the depression exerted by the motor on the carburation chambers, the flow of motor fuel is regularized by adjusting the opening of valves mounted on said reservoir of the carburetor, said valves comprising:
1. motor fuel variable flow valve with a plurality of outlets enabling an individual supply to each carburation chamber;
2. at least one valve which operates intermittently and is automatically controlled, enabling a flow of an excess of fuel depending on the operating conditions of the motor;

a mechanism synchronizing the opening of air admission butterfly valves, said mechanism being automatically adjustable with respect to the opening of the motor fuel variable flow valve, to produce in each carburation chamber a flow of a mixture having a constant volume ratio of motor fuel and air for all operating conditions of the motor;

in each carburation chamber being provided with two compartments which are independent from one another, each having a different function but both operating simultaneously to produce the carburation;

the variable flow valve feeding the first of said compartments of each carburation chamber;

the valve operating intermittently feeding the second of said compartments of each carburation chamber;

one of the two compartments of each carburation chamber being provided with a flap;

an automatic control mechanism synchronizing the position of said flaps, to regularize with the same precision a proportion of the quantities of air which pass in both compartments of each carburation chamber depending on the temperature of the mixture of motor fuel vapour and air at the inlet of the motor cylinders;

a heat exchanger connected downstream to the carburetor and heated by the combustion gases, the body of said exchanger being a distinct and removable member and is provided with a heat exchanger duct connecting the first compartments of the carburation chambers to the motor-cylinders;

passages connecting the second said compartments directly to each motor cylinder.

* * * * *